United States Patent
Logvinov (10) Patent No.: US 9,024,471 B2
(45) Date of Patent: May 5, 2015

(54) SYSTEM AND METHOD FOR AN INTELLIGENT POWER CONTROLLER

(75) Inventor: Oleg Logvinov, East Brunswick, NJ (US)

(73) Assignee: STMicroelectronics, Inc., Coppell, TX (US)

( * ) Notice: Subject to any disclaimer, the term of this patent is extended or adjusted under 35 U.S.C. 154(b) by 526 days.

(21) Appl. No.: 13/461,173

(22) Filed: May 1, 2012

(65) Prior Publication Data

US 2012/0280565 A1 Nov. 8, 2012

Related U.S. Application Data

(60) Provisional application No. 61/481,595, filed on May 2, 2011.

(51) Int. Cl.
*H05B 37/02* (2006.01)
*H04B 3/54* (2006.01)
*H05B 37/00* (2006.01)

(52) U.S. Cl.
CPC ............. *H05B 37/0254* (2013.01); *Y02B 20/48* (2013.01); *H04B 3/54* (2013.01)

(58) Field of Classification Search
USPC .......................................................... 307/29
See application file for complete search history.

(56) References Cited

U.S. PATENT DOCUMENTS

| | | |
|---|---|---|
| 6,917,888 B2 | 7/2005 | Logvinov et al. |
| 7,106,177 B2 | 9/2006 | Logvinov et al. |
| 7,193,506 B2 | 3/2007 | Logvinov et al. |
| 7,245,625 B2 | 7/2007 | Manis et al. |
| 7,286,812 B2 | 10/2007 | Manis et al. |
| 7,369,579 B2 | 5/2008 | Logvinov et al. |
| 7,683,777 B2 | 3/2010 | Macaluso et al. |
| 7,804,673 B2 | 9/2010 | Macaluso et al. |
| 7,830,248 B2 | 11/2010 | Logvinov et al. |
| 8,115,605 B2 | 2/2012 | Macaluso et al. |
| 2004/0036478 A1 | 2/2004 | Logvinov et al. |
| 2005/0043858 A1 | 2/2005 | Gelman et al. |
| 2005/0271086 A1 | 12/2005 | Macaluso et al. |
| 2006/0072621 A1 | 4/2006 | Macaluso et al. |
| 2006/0119176 A1 | 6/2006 | Macaluso et al. |
| 2007/0047573 A1 | 3/2007 | Logvinov et al. |
| 2008/0172312 A1* | 7/2008 | Synesiou et al. ................ 705/34 |

* cited by examiner

*Primary Examiner* — Robert Deberadinis
(74) *Attorney, Agent, or Firm* — Slater & Matsil, L.L.P.

(57) ABSTRACT

In accordance with an embodiment, a method of operating a node coupled to a power network and a communications link includes receiving a status from a further node coupled to the power network via the communications link, and adjusting a power consumption of a device coupled to the node and powered by the power network based on the status message and based on a first rule set.

34 Claims, 4 Drawing Sheets

SYSTEM AND METHOD FOR AN INTELLIGENT POWER CONTROLLER

PRIORITY CLAIM TO PROVISIONAL APPLICATION

This patent application claims priority to U.S. Provisional Application No. 61/481,595 filed on May 2, 2011, entitled "System and Method for an Intelligent Lighting Controller," which application is hereby incorporated by reference herein.

TECHNICAL FIELD

The present invention relates generally to power management systems, and more particularly to a system and method for an intelligent lighting controller.

BACKGROUND

As renewable energy sources, such as solar power and wind power, are becoming more prevalent, and the cost of the energy supplied from the electrical grid is becoming more and more expensive, residential and commercial power systems are becoming more sophisticated in order to incorporate electric power from a main grid with locally generated power. For example, a home may contain a number of solar panels from which to draw energy during the daytime to supplement power from the main electrical grid. In the evening, or during portions of the day in which the sky is cloudy, the home may draw most or all of its power from the main electrical grid, thereby reducing the amount of non-renewable energy consumed during the day, and reducing the overall energy consumption and subsequently energy cost billed by the electrical utility. Besides cost, an extra benefit to having renewable energy sources in the home is that the availability of local renewable energy during the day reduces the electrical load to the utility during times of peak consumption.

Some electrical utilities have proposed addressing the issue of peak consumption by charging variable electric rates in order to further encourage consumers to use energy during off-peak hours. In some cases, electric utilities have implemented "load shedding" practices in which high energy consuming equipment is automatically shut-off during periods of peak demand, usually via a command from the power utility. These load shedding practices are most often applied to commercial accounts that consume high amounts of energy. Power companies may also provide economic incentives, such as lower electric rates, to customers who agree to participate in load shedding programs.

SUMMARY OF THE INVENTION

In accordance with an embodiment, a method of operating a node coupled to a power network and a communications link includes receiving a status from a further node coupled to the power network via the communications link, and adjusting a power consumption of a device coupled to the node and powered by the power network based on the status message and based on a first rule set.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the embodiments, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, an intelligent power controller in communication with other nodes coupled to a power network. In one example, an intelligent lighting controller is disclosed. However, embodiment systems and methods are not limited to lighting controllers, and may be applied to other types of power controllers, as well as other types of control systems.

Generally, embodiments of the present invention involve independent power control nodes that are coupled to an AC power line with respect to power, and are in communication with each other via a communication network. In some embodiments, this communication network may be a power line communication network that communicates over the same power distribution lines from which the power control nodes receive their power. In an embodiment, each node adjusts the performance of its respective function based on a set of rules that pertain to a current condition on the power network. In some embodiments, these rules may be locally and/or temporality overridden. In such a case, the overridden node can signal the power network of its override status and the remaining nodes of the network adjusts is power behavior accordingly.

Figure 1:
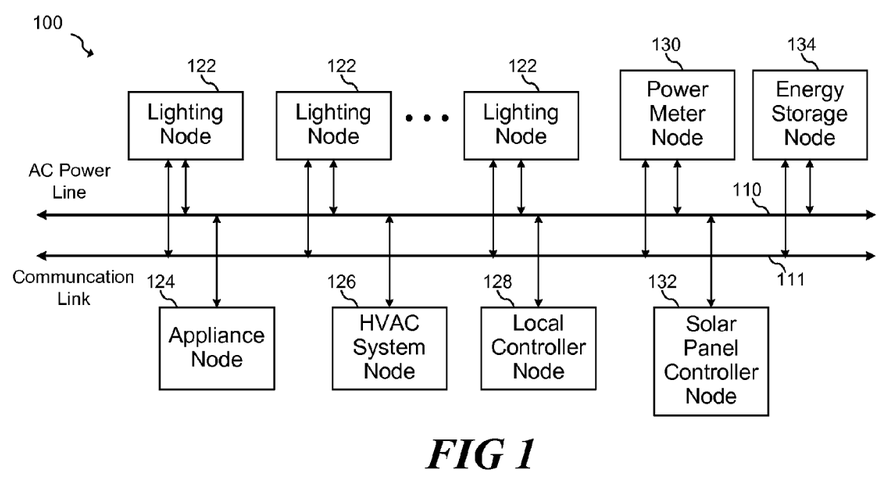
FIG. 1 illustrates a block diagram of an embodiment power line communications network.
Figure 2A:
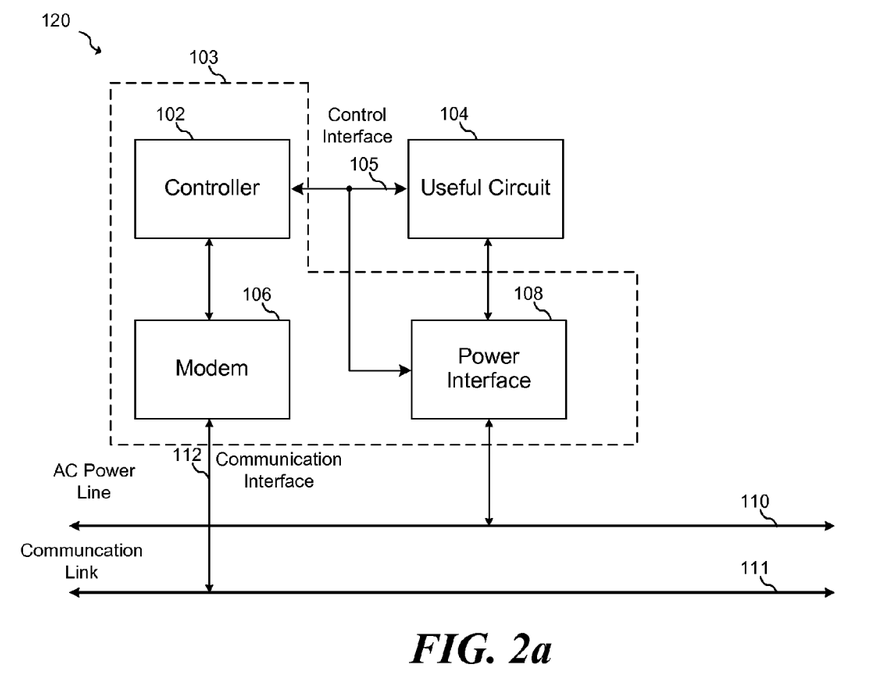
FIGS. 2a-b illustrate embodiment controlled power nodes.

FIG. 1a illustrates is a block diagram of an embodiment power line communications network 120 comprising a number of lighting nodes 122 (see FIG. 1), networked appliance 124, HVAC system 126, a local controller 128 (such as a user terminal), power meter 130, a solar panel controller 132, and an energy storage device 134, such as a battery. In some embodiments, this energy storage device may be an electric car that may consume power from AC power line 110 during some time periods, or make power available to AC power line 110 during other periods of time. In an embodiment, the devices coupled to AC power line 110 communicate with each other over communication link 111, which may be implemented using a wired local area network connection such as Fast Ethernet, a wireless local area network, such as a 802.11 WiFi or ZigBee network, or using a power line communication network such as IEEE 1901, IEEE P1901.2, HomePlug GP/AV/AV2/1.0, G.hn, G.hnem, and other similar technologies. Alternatively, other network technologies or communication links may be used. In embodiments, any number of lighting nodes 122, or other devices, may be coupled to power line 110, and that any number of other device types may also be coupled to power line 110 other than those shown in FIG. 2. It should be appreciated that in further alternative embodiments, power line 110 may be implemented using a DC power line, or other power distribution type including wireless power.

In some embodiments, some of the various nodes on the network may both consume and release energy. For example, one node on the network may be an appliance, such as an electric car, that contains a rechargeable battery. When the electric car's batteries are being recharged, the electric car may alert other nodes of the power network that the electric car is being charged and that less power is available on the power network. During this time, remaining nodes on the network may reduce their power in order to keep the total peak consumption of the network below a maximum limit. At other times, energy from the electric car's batteries may actually be available to the power network, at which time the remaining nodes in the network may be operable at full power consumption.

In another example, one node on the network may be an electric appliance, for example, a washer, dryer, or a pool pump, that has various high-power operation modes. In some embodiments, these appliances may receive a message from the network that a low-power condition is in existence. In response, the appliances may reduce their power consumption by operating in a lower power operation mode, or by delaying the onset of high-power operation modes. For example, a washing machine may operate its motor at a lower speed, or delay the onset of the spin cycle in order to save energy. Likewise, a pool pump may lower its speed or delay water filtering phases until more power is available from the power network. In other embodiments, these appliances with high-power operation modes may even signal the power network via communications link 111 to notify other nodes that they are about to enter or are currently in a high-power operation mode. In this case, other nodes in the network may adjust their power consumption accordingly. This approach may be also applicable to spread the startup peak consumption of multiple appliances.

In embodiments of the present invention, power savings across the network may be achieved even without all nodes on the network shutting down. For example, the nodes in the network may work together to collectively consume energy over a period of time in such a way that peak consumption is minimized or is below a particular threshold. This may be achieved by nodes operating in lower power operation modes, or noncritical nodes shutting down their loads. For example, during times of peak power consumption or times of low power availability, noncritical lighting, such as decorative lighting or lights in infrequently used areas of the house may be dimmed or shut off, while lighting in occupied living areas remains lit at full intensity.

In some embodiments, power condition status may also be based on power shedding commands issued by the power utility directly to all nodes on the network or via a proxy or gateway node on the network. In one embodiment, the net power consumption of the home power network is reduced according to a power reduction goal using embodiment techniques rather than having certain pieces of equipment experience a hard shutdown in response to the issuance of the power shedding command. For example, instead of an air-conditioning system experiencing a hard shut off, a requisite amount of power savings may be achievable by temporarily increasing the thermostat setting and delaying the onset of high-power modes of other appliances such as the spin cycle of a washing machine, the dry cycle in the dryer, or the sweep cycle of the swimming pool filtration system. In other embodiments, embodiment methods may also be applied alongside or in conjunction with hard shutdown scenarios.

FIG. 2a illustrates embodiment node 120 having a power line modem 106, controller 102, useful circuit 104 and power interface 108. In an embodiment, modem 106 transmits and receives data to and from communication link 111 via communication interface 112. Power interface 108 provides power from power line 110 to useful circuit 104. Controller 102 controls the useful circuit via control interface 105 based on embodiment rules and power line condition data received from communication link 111. Controller 102 may control the power consumption of useful circuit 104 directly via control interface 105, indirectly via control interface 105 and power interface 108, or both directed and indirectly. In various embodiments, useful circuit 104 may be any electrical circuit coupled to AC power line 110, including, but not limited to an appliance, lighting node, energy storage system, HVAC system and/or other circuit types.

System 100 may be physically partitioned in a number of different ways. For example in one embodiment, controller 102, modem 106 and power interface 108 may be packaged together in the same device, chassis and/or circuit board 103 as denoted by the dotted lines, and useful circuit 104 interfaces to device 103 via control interface 105 via control interface 105 and/or power interface 108. One example of such a system partitioning is a lighting node, where device 103 comprises a first piece of hardware, and useful circuit 104 comprises a lighting device. In some embodiments, controller 102 and/or modem 106 may reside on the same integrated circuit. In other embodiments, the system may be partitioned differently. Controller 102 and modem 106 may reside on a same circuit board and/or integrated circuit, and power interface 108 and useful circuit 104 may reside elsewhere. In heavy duty appliance embodiments, such as a washing machine or dryer, all portions of system 100 may reside in the same device. It should be further understood that the system partitioning described herein are just a few examples of many possible system partitions including implementations such as System-on-Chip and System-in-Package.

Figure 2B:
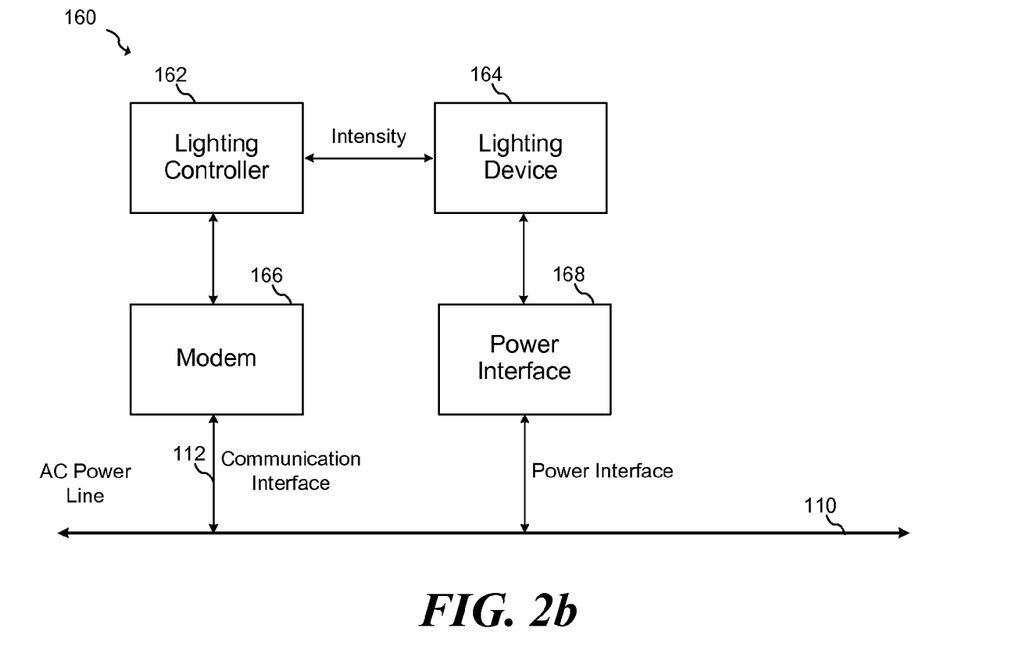

FIG. 2b illustrates embodiment lighting node 160 having a power line modem 166, lighting controller 162, lighting device 164 (such as an LED) and power interface 168. In an embodiment, power line modem 166 transmits and receives data to and from power line 110 via communication interface 112. Power interface 168 provides power from power line 110 to lighting device 164. The lighting controller controls the lighting device based on embodiment rules and received power line conditions. In alternative embodiments, modem 166 may be coupled to an alternative communication network besides a power line network, such as a wired or wireless LAN.

In one embodiment, the rule sets that govern the power consumption of embodiment lighting node 160 include a default rule set, an override rule set, and a conflict rule set. The default rule set defines the behavior of the node with respect to network conditions. In some examples, each node may have one of a plurality of rule sets representing different classes of service. For example, in one embodiment, the different classes of service can include four classes: class A, class B, class C, and class D. Class A represents a constant intensity class in which the lighting node maintains a constant intensity at its light source regardless of power network conditions. Class B represents a 10% intensity reduction. Here, lighting node 160 maintains a first intensity when the power network has sufficient power, but reduces its light intensity up to 10% if the node receives a message that the power system is in a low power state. This low power state may occur, for example, if a system's solar panels are experiencing a low light condition cause by clouds or inclement weather. In some situations, this message is generated by a control node associated with the solar panels. The lighting intensity reduction may be effected by reducing the voltage or current provided to the light, or by reducing the duty cycle of the power signal to the light, for example if, the light is an LED. It is important to note that some embodiments of the present invention allow for both centralized and decentralized control message generation. In the case of a centralized control message generation, one node may be assigned the task of generating control messages based on the information provided to this node from other nodes and the outside environment such as an example main power grid, user interaction, etc. In the case of the decentralized message generation, all nodes inform other nodes on the network of changes to the status and all nodes react to the messages when they receive them.

In an embodiment, class C represents a 50% intensity reduction, and class D represents a 100% intensity reduction. Devices of class D are permitted to shut down during low power conditions. It should be understood that the four classes described herein are just one example of an embodiment system. Alternative embodiments can include greater or fewer than four classes, and/or classes corresponding to different intensity levels, power levels, and behavior definitions than those described herein.

In further embodiments, other rule classes may be applied to other device types. For example, in an embodiment heavy duty electrical appliance, service class A may represent a normal mode of operation, while class B may represent a reduced power consumption mode of operation. For example, a washer motor may be driven at a reduce speed, or an electric dryer may be operated with a reduced heat output. Another service class may represent a delayed operation of high current condition. For example service class C may represent delaying a spin cycle in a washing machine, a heat cycle in an electric dryer, or a sweep or filtering cycle in an electric pool pump.

In an embodiment, in some cases, a user may temporarily or permanently override the default rule set in order to have a device operate according to an override rule set. This may occur, for example, if a user wants to have a light stay on at constant intensity regardless of power conditions. In some embodiments, the power node associated with the overridden node sends a message to other nodes on the power line network when the override condition conflicts with the current power condition. For example, if the user requests a constant light intensity during a time in which the current power network is in a low power state, the power node signals the remaining nodes of this rule conflict and the remaining nodes can compensate for this situation by reducing their power consumption according to the override rule set. Again, it should be appreciated that the description of the override rule set is just one embodiment example of many possible implementations.

When a first node receives a signal from other elements on the network indicating that the other element has been overridden and the overridden condition is in conflict with a current rule, the first node reduces it power according to the conflict rule set. For example, if the power system is experiencing a low power condition and the first node will adjust its power according to a default rule, for example, by reducing its light intensity by 10%. If the first node receives a message from another node stating that the other node cannot reduces its power according to the default rule because it has been overridden, the first node can further reduce its power according to a conflict rule. In one example, the first node further reduces it power by another 10%.

In some embodiments, the system is made aware of the number of overrides occurring in the system and the overall power budget. In such an embodiment, the network can tell the difference between a single node being overridden (requiring little, if any, compensation action), and many nodes being overridden (requiring more severe action by the remaining nodes of the network.) In other embodiments, however, command messages are based, for example, on the measurement of variables including, but not limited to consumption, tariffs, and output of renewable sources. In some embodiments, the system gathers such data and calculates projections and trends with which to create and/or implement rule sets. In some embodiments this can be done adaptively.

In some cases, dealing with conflict situations may take into account a number of factors such as the amount of power available in storage (electric car or any other type of energy storage) and user provisioned rules related to the allowance to consume more power at higher costs. Embodiments of the present invention provide an opportunity to design systems following good—better—best principles where the most simplistic embodiment would simply offer decentralized control with lighting or other type of load nodes responding to the various stages of load shedding messages, while more sophisticated embodiment of the system offer an opportunity for optimization of energy consumption and intelligent load shedding.

In an embodiment of the invention, a plurality of nodes may be configured to work in a decentralized message generation environment, in which some or all of the nodes keep track of messages announcing various status changes, and make decisions related to the local load attached to the particular node, or generation control based on the set of said rules.

In some embodiments, based on the provided rule sets, operation of the power network proceeds in a distributed sense. For example, if a solar panel senses a cloud, or if the power meter or local controller is aware that the power network is going to be in a low power state, (or a high cost state with respect to variable electric rates), the rest of the network is signaled via the power line communication network of this change in state. Each node then adjusts its power consumption according to its own set of rules. If one or more nodes have been overridden, the rest of the network reduces its power in order to compensate for the overridden nodes.

In embodiments, power line communication technologies, such as IEEE 1901, IEEE P1901.2, HomePlug GP/AV/AV2/1.0, G.hn, G.hnem, and other similar technologies can be used. Embodiment message formats can include, but are not limited to XML, or message formats defined in Smart Energy Profile 2.0 and/or ISO/IEC 15118. Of course, many other formats can be used also.

Embodiment systems and methods can be applied to a variety of device classes. For example, embodiments can be directed toward consumer devices such as, but not limited to, lighting fixtures for indoor and outdoor use, HVAC, home appliances, and consumer electronics devices. Embodiments can also be directed toward devices for external sources such as power meters and utility power feeds of any kind, and toward device for internal sources, such as plug-in hybrid and electric cars, solar panels and wind turbines. Furthermore, embodiment systems can include LED lighting modules, load controls, controllers for renewable sources, and power line network integrated circuits. It should be appreciated that these device classes and embodiment systems are examples of the types of systems to which embodiments concepts can be applied. Embodiment systems and methods can also be directed toward other device classes and systems not specifically mentioned herein.

In some embodiments, other systems besides lighting systems can be controlled using embodiment concepts. For example, appliances, HVAC systems, and other system may be configured to follow similar rule based behavior as the lighting controllers. In some embodiments, all nodes (including power meters and renewable energy sources) are may transmit broadcast messages that travel within the "plane of interaction" or within a Logical Network or Home Area Network and may be understood by all nodes. Alternatively, only subset of power nodes may transmit broadcast messages. The power consumption of appliances can, therefore, be controlled based on various conditions. For example, if the sky becomes cloudy and the output of solar panels drops by 30%, a real time measurement of a panel output arrives to the Home Energy Manager (HEM). The HEM may be implemented, for example, by a standalone device coupled to the network or an application running on a power meter. In an embodiment, the HEM analyzes the power budget based on the status of all devices, current tariffs, weather forecast, time of the day, etc and sends out an alert signal/message that is interpreted by Class C devices as the command to lower the power consumption/intensity. The same message could be interpreted by a washing machine, for example, as "suspend the spin for 10 min." It should be understood that this is just one example of many different embodiment systems and scenarios.

Figure 3:
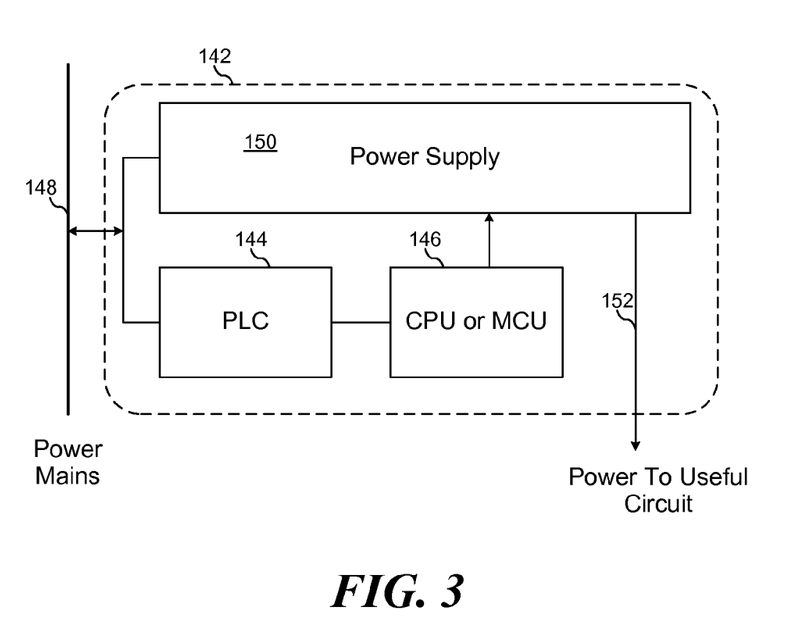
FIG. 3 illustrates an embodiment powerline communication element.

FIG. 3 illustrates a block diagram showing embodiment intelligent power network node 142 with respect to power flow. Node 142 has power supply 150 coupled to power mains 148 and to useful circuit interface 152, which provides power a useful circuit, such as those discussed herein. Useful circuit interface 152 may also be coupled to a light emitter of any kind. Programmable logic controller (PLC) 144 having a communications interface is coupled power mains 148 and CPU or MCU 146, which controls power supply 150. Alternatively, other architectures may be employed to implement node 142.

Figure 4:
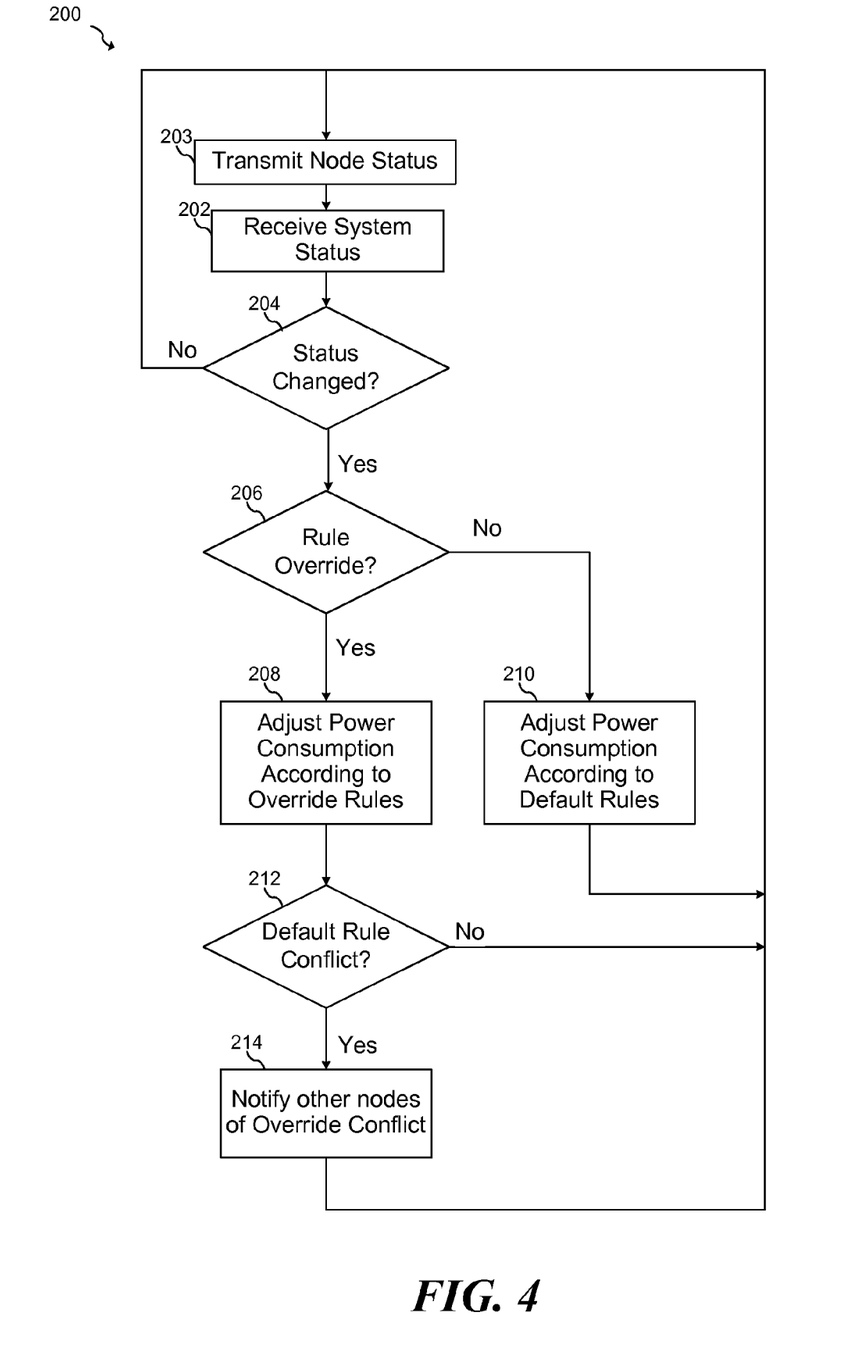
FIG. 4 illustrates a flow chart of an embodiment method.

FIG. 4 illustrates a flow chart of embodiment method 200. In step 202, a node receives a system status. If the status has changed (step 204), the node determines whether it is necessary to override default operating rules (206). If so, the power consumption of the controlled useful circuit or other load is adjusted according to an override rule set (step 208). In embodiment lighting nodes, this power consumption may be adjusted, for example, by adjusting the intensity of the light source. If it is not necessary to override the default operating rules, the power consumption is adjusted according to default rules (step 210). If the power consumption is controlled according to override rules (step 208), the node determines whether there is a conflict with default rules (step 212). If so, other nodes are notified of the conflict by sending, for example, an override conflict message on the communications network, such as a power line network (step 214).

In some embodiments, the status of the node may be optionally sent in step 203. For example, a washing machine may notify other nodes that it is entering a high power consumption mode, such as a spin cycle. In another example, an electric car may notify other nodes that the car battery is being charged and/or power within the battery is available to the power system.

Figure 5:
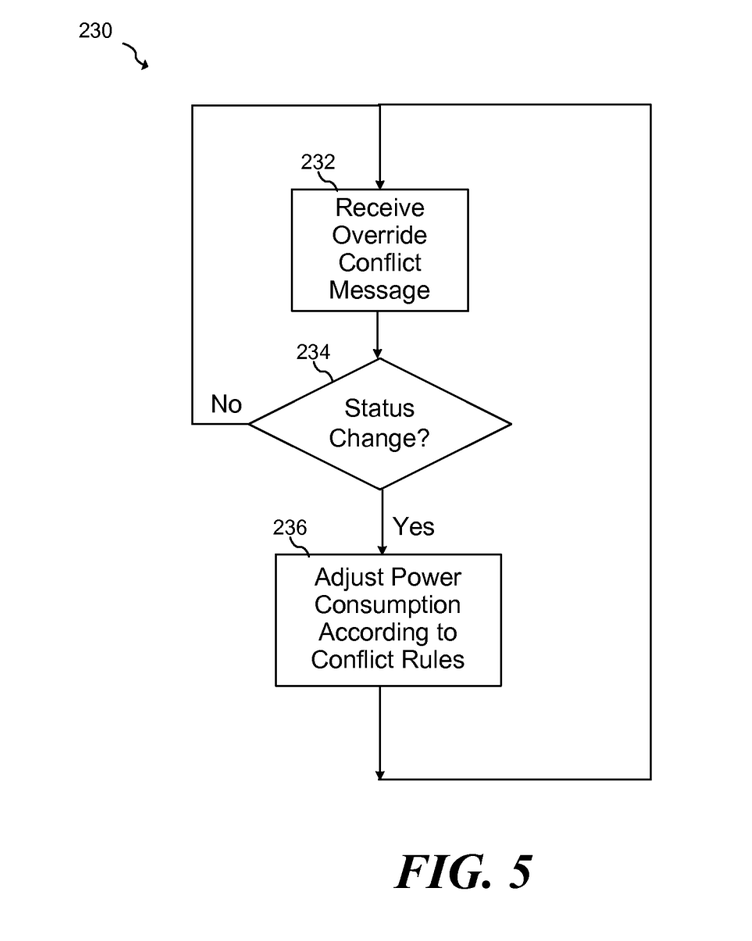
FIG. 5 illustrates a flow chart of a further embodiment method.

FIG. 5 illustrates a flow chart of embodiment method 230 regarding the receipt of an override conflict message from another node. When a node receives an override conflict message (step 232), the node determines whether there is a status change (step 234). If so, the node adjusts the power consumption of its attached useful circuit (such as a light intensity for lighting nodes) according to conflict rules (step 236).

In an embodiment, a method of operating a node coupled to a power line network includes receiving line condition via the power line network. In some embodiments, the node can also receive, for example, power budget status, load control messages and other information from the power line network. The method also includes adjusting a power consumption of a device powered by the power line network based on the line condition status and based on a rule set. In some embodiments, adjusting includes adjusting an intensity of a light source coupled to the node according to the rule set. In other embodiments, adjusting includes adjusting the power of a load. In some embodiments, the adjusting includes adjusting the intensity of the light source to a first intensity when the line condition status indicates a normal condition, adjusting the intensity of the light source to a second intensity when the line condition status indicates a low power condition.

In a further embodiment, a system includes a powerline communication interface configured to be coupled to an AC power line, a power interface configured to be coupled to the AC power line, and a controller coupled to the powerline communication interface. In an embodiment, the controller and the power interface are configured to be coupled to a useful circuit, and the controller is configured to adjust a power consumption of the useful circuit based on a power network condition message received by the power line communication interface and a first set of rules.

In an embodiment, the useful circuit includes a light source, and the controller adjusts an intensity of the light source to a first intensity level when the power network condition message indicates that the power network is in a normal condition. The controller adjusts the intensity of the light source to a second intensity level when the power network condition message indicates that the power network is in a low power operating condition. In some embodiments, the light source comprises an LED light source. In an embodiment, the system is implemented, for example, using a controller, such as a microcontroller coupled to a PLC that is configured to be coupled to a power-line network. The controller is configured to be coupled to a power supply via a control interface. All or some of the components of the controller, PLC and the power supply can be implemented on one or more integrated circuits, or as a system on a chip (SoC).

Embodiments of the present invention can be applied to networked LED lighting. For example, embodiments can be directed, for example, to residential and office lighting that supports various service profiles for each lighting fixture. Embodiment lighting service profile defines light output intensity for the lighting fixture and the mapping between demand response messages and actions of the lighting fixture.

In an embodiment lighting node, the following light intensity profiles may be used:
Setting A—100%
Setting B—80%
Setting C—50%
Setting D—Off, where setting A corresponds to a full light intensity, setting B corresponds to an 80% light intensity, setting C corresponds to a 50% light intensity and setting D correspond to shutting off the light source. It should be understood that these intensity profiles are example profiles, and other intensity profiles may be used.

In an embodiment, light intensity profile settings A, B C and D may be selected according to the following mapping:
Powered by Renewable==Setting A
Powered by Grid==
    If not "Critical"—Setting B;
    If "Critical"—Setting A
Powered by Grid AND Load Shedding==
    If not "Critical"—Setting C;
    If "Critical"—Setting B.

In an embodiment, setting A is used when the power system is powered by a renewable source, such a solar panel as an example. If the power system is powered by the electrical grid, setting A is used if the light source is a critical light source, such as a light source that provides illumination in a work area or a similar setting, and setting B is used if the light source is not a critical light source, such as a light source that provides illumination to an unoccupied space. If the power system is powered by the grid and load shedding is required, for example, in the case of a low power condition, setting B is used if the light source is a critical light source and setting C is used if the light source is not a critical light source. In an embodiment, each lighting node may receive status information including power system status and whether or not the particular lighting node is considered a critical light source, and apply the above mapping.

Embodiments of the present invention can be further applied to develop a set of recommendations for the smart lighting systems that takes an account demand response measures and performance of local renewable sources. Furthermore, embodiments can be used for incentivizing consumers and commercial property operators to deploy smart lighting AC and DC systems.

In accordance with an embodiment, a method of operating a node coupled to a power network and a communications link includes receiving a status message from a further node coupled to the power network via the communications link, and adjusting a power consumption of a device coupled to the node and powered by the power network based on the status message and based on a first rule set. In some embodiments, receiving the status message includes receiving a line condition, a status of the system, a power budget status, tariff related information, scheduling information, or a load control message.

In an embodiment, the method further includes adjusting the power consumption of the device to a first power consumption level when the status message indicates a normal condition, and adjusting the power consumption of the device to a second power consumption level when the status message indicates a low power condition, such that the second power consumption level is less than the first power consumption level.

In an embodiment, adjusting includes adjusting an intensity of a light source coupled to the node according to the rule set. Adjusting the intensity may include adjusting the intensity of the light source to a first intensity when the status message indicates a normal condition, and adjusting the intensity of the light source to a second intensity when the status message indicates a low power condition.

In some embodiments, the method further includes transmitting a node status message to the power network via the communications link. This may include notifying the network that the node is providing power to the power network, or that the node is entering a high power consumption state. In some embodiments, adjusting the power consumption of the device includes delaying entry into a high power state.

In some embodiments, receiving the status message from the further node coupled to the power network via the communications link comprises receiving data via a powerline communication network or via a wireless communication network.

In an embodiment, the method further includes receiving an rule override message from the network, adjusting the power consumption of the device according to a second rule set in response to receiving the override message, and when adjusting the power consumption of the device according to the second rule set conflicts with the first rule set, transmitting an override status message to the power network via the communications link, the override status message notifying other nodes on the network of an override conflict.

In accordance with a further embodiment, a system includes a power interface configured to be coupled to an AC power line, a communication interface configured to be in communication with other systems coupled to the AC power line; and a controller coupled to the communication interface. The controller and the power interface are configured to be coupled to a useful circuit, and the controller is configured to adjust a power consumption of the useful circuit based on a power network condition message received by the communication interface and based on a first set of rules. In some embodiments, the communication interface comprises an AC powerline communication interface.

In an embodiment, the useful circuit includes a light source, and the controller adjusts an intensity of the light source to a first intensity level when the power network condition message indicates that the power network is in a normal condition, and the controller adjusts the intensity of the light source to a second intensity level when the power network condition message indicates that the power network is in a low power operating condition. In some embodiments, the light source may include an LED light source.

In an embodiment, the useful circuit may include a rechargeable battery, and the controller may be configured to adjust the power consumption of the rechargeable battery by reducing a recharge current or delaying a recharge operation when the power network condition message indicates that the power network is in a low power operating condition. The controller may be further configured to transmit a status message to the other systems coupled to the AC power line via the communications interface indicating that the rechargeable battery is operable to provide power to the AC power line.

In an embodiment, the useful circuit may include an appliance, and the controller may be configured to adjust the power consumption of the appliance by delaying a high power operation phase when the power network condition message indicates that the power network is in a low power operating condition. The controller may be further configured to transmit a status message to the other systems via the communication interface that the appliance is entering the high power operation phase.

In accordance with a further embodiment, a power system controller for a node coupled to a power network includes a first interface configured to be operably coupled to a useful circuit, and a second interface configured to be operably coupled to a communication interface that is configured to communication with other nodes coupled to the power network. The power system controller is configured to adjust a power consumption of the useful circuit from the power network based on a power network condition message received by the communication interface and according to a first set of rules. In some embodiments, the system further includes the communication interface.

In an embodiment, the controller may be configured to adjust the power consumption of the useful circuit to a first power consumption level when the power network condition message indicates a normal power condition, and adjust the power consumption of the useful circuit to a second power consumption level when the power network condition message indicates a low power condition.

In some embodiments, the controller is disposed on an integrated circuit. Furthermore, the controller may be further configured to transmit a node status message to the other nodes via the communication interface. In some embodiments, the node status message is configured to notify the other nodes that the node is entering a high power consumption state.

In an embodiment, the controller is configured to place the useful circuit in a state in which the useful circuit supplies power to the power network, and transmit a node status message indicating that the node is providing power to the network. The controller may also be configured to place the useful circuit in a high power consumption state, and transmit a node status message indicating that the node is in a high power consumption state.

In some embodiments, the power system controller is further configured to receive a rule override message via the communication interface and adjust the power consumption of the useful circuit according to a second rule set in response to the rule override message. When adjusting the power consumption of the useful circuit according to the second rule set conflicts with the first rule set, the controller may transmit an override status message via the communications interface, wherein the override status message is configured to notify the other nodes of an override conflict.

In accordance with a further embodiment, a system includes a plurality of nodes. Each node may include a power interface configured to be coupled to an AC power line, and a communication interface. In an embodiment, each node is configured to receive and transmit status messages, and adjust power consumption or power generation of a useful circuit coupled to the power interface based on the status messages and based on a rule set. In some embodiments, the plurality of nodes are configured to work in a decentralized manner to reduce power consumed by devices attached to the nodes. The status messages may include a status of a node, a load control message or a power generation control message.

The following U.S. Patent Application Publications and U.S. patents are incorporated herein by reference in their entirety: U.S. Patent Publication No. 2007/0047573, entitled "Networking and multimedia adapter for power outlets;" U.S. Patent Publication No. 2006/0119176, entitled "Method and system for audio distribution in installations where the use of existing wiring is preferred;" U.S. Patent Publication No. 2006/0072621, entitled "Intelligent, self-aware power-line conditioning and communication node;" U.S. Patent Publication No. 2005/0271086, entitled "System and method for an intelligent load center with integrated powerline communications network switching and network management capabilities;" U.S Patent Publication No. 2005/0043858, entitled "Atomic self-healing architecture;" U.S. Patent Publication No. 2004/0036478, entitled "Method and system for power line network fault detection and quality monitoring; U.S. Pat. No. 7,830,248, entitled, "Networking and multimedia adapter for power outlets;" U.S. Pat. No. 7,804,673, entitled "Intelligent, self-aware powerline conditioning and communication node;" U.S. Pat. No. 7,683,777, entitled "Method and system for audio distribution in installations where the use of existing wiring is preferred;" U.S Pat. No. 7,286,812, entitled "Coupling between power line and customer in power line communication;" U.S. Pat. No. 7,245,625, entitled "Network-to-network adaptor for power line communications;" and U.S. Pat. No. 6,917,888, entitled "Method and system for power line network fault detection and quality monitoring."

In particular, U.S. Patent Publication No. 2005/0043858 describes the concept of "planes of interaction" that can be dynamically established among the devices in the "atom of the grid", a home could be an "atom of the grid" where a meter, HVAC, lights, renewable form a "plane of interaction" that allows for this autonomous decision making process regarding the energy use within the home. Such concepts may also be applied to embodiments herein. U.S. Patent Publication No. 2004/0036478 discusses the concept of learning and can also be applied to embodiments, herein.

Advantages of embodiment systems include the ability for enable a system to optimize its power in a decentralized manner, while allowing for flexibility in operation and implementation. Embodiment systems also provide an extensible architecture where new devices based on interoperable technologies can be added in the future.

Further advantages of some embodiments include the ability to create systems that optimize or improve overall power consumption, while reducing the amount of power consumed from the main power grid with little or no user interaction.

Although the embodiments and their advantages have been described in detail, it should be understood that various changes, substitutions and alterations could be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a node coupled to a power network and a communications link, the method comprising:
   receiving a status message by the node via the communications link from a further node coupled to the power network; and
   adjusting a power consumption of a device coupled to the node and powered by the power network based on the status message and based on a first rule set.

2. The method of claim 1, wherein receiving the status message comprises receiving a line condition, a status of the power network, a power budget status, tariff related information, scheduling information, or a load control message.

3. The method of claim 1, wherein adjusting comprises:
   adjusting the power consumption of the device to a first power consumption level when the status message indicates a normal condition; and
   adjusting the power consumption of the device to a second power consumption level when the status message indicates a low power condition, wherein the second power consumption level is less than the first power consumption level.

4. The method of claim 1, wherein adjusting comprises adjusting an intensity of a light source coupled to the node according to the rule set.

5. The method of claim 4, wherein the adjusting the intensity of the light comprises: adjusting the intensity of the light source to a first intensity when the status message indicates a normal condition; and
adjusting the intensity of the light source to a second intensity when the status message indicates a low power condition.

6. The method of claim 1, further comprising transmitting a node status message to the power network via the communications link.

7. The method of claim 6, wherein transmitting the node status message comprises notifying the network that the node is providing power to the power network.

8. The method of claim 6, wherein transmitting the node status message comprises notifying the network that the node is entering a high power consumption state.

9. The method of claim 1, wherein adjusting the power consumption of the device comprises delaying entry into a high power state.

10. The method of claim 1, wherein receiving the status message from the further node coupled to the power network via the communications link comprises receiving data via a powerline communication network.

11. The method of claim 1, wherein receiving the status message from the further node coupled to the power network via the communications link comprises receiving data via a wireless communication network.

12. The method of claim 1, further comprising:
receiving an rule override message from the network;
adjusting the power consumption of the device according to a second rule set in response to receiving the override message; and
when adjusting the power consumption of the device according to the second rule set conflicts with the first rule set, transmitting an override status message to the power network via the communications link, the override status message notifying other nodes on the network of an override conflict.

13. A system comprising:
a power interface configured to be coupled to an AC power line;
a communication interface configured to be in communication with other systems coupled to the AC power line; and
a controller coupled to the communication interface, wherein
the controller and the power interface are configured to be coupled to a useful circuit, and
the controller is configured to adjust a power consumption of the useful circuit based on a power network condition message received by the communication interface and based on a first set of rules.

14. The system of claim 13, wherein the communication interface comprises an AC powerline communication interface.

15. The system of claim 13, wherein
the useful circuit comprises a light source; and
the controller adjusts an intensity of the light source to a first intensity level when the power network condition message indicates that the power network is in a normal condition; and
the controller adjusts the intensity of the light source to a second intensity level when the power network condition message indicates that the power network is in a low power operating condition.

16. The system of claim 15, wherein the light source comprises an LED light source.

17. The system of claim 13, wherein
the useful circuit comprises a rechargeable battery; and
the controller is configured to adjust the power consumption of the rechargeable battery by reducing a recharge current or delaying a recharge operation when the power network condition message indicates that the power network is in a low power operating condition.

18. The system of claim 17, wherein the controller is further configured to transmit a status message to the other systems coupled to the AC power line via the communications interface indicating that the rechargeable battery is operable to provide power to the AC power line.

19. The system of claim 13, wherein:
the useful circuit comprises an appliance; and
the controller is configured to adjust the power consumption of the appliance by delaying a high power operation phase when the power network condition message indicates that the power network is in a low power operating condition.

20. The system of claim 19, wherein the controller is further configured to transmit a status message to the other systems via the communication interface that the appliance is entering the high power operation phase.

21. The system of claim 13, wherein the system is configured to:
receive a rule override message via the communication interface;
adjust the power consumption of the useful circuit according to a second rule set in response to the rule override message; and
when adjusting the power consumption of the useful circuit according to the second rule set conflicts with the first rule set, transmit an override status message via the communications interface, wherein the override status message is configured to notify the other systems of an override conflict.

22. A power system controller for a node coupled to a power network, the power system controller comprising:
a first interface configured to be operably coupled to a useful circuit; and
a second interface configured to be operably coupled to a communication interface that is configured to communicate with other nodes coupled to the power network, wherein the power system controller is configured to
adjust a power consumption of the useful circuit from the power network based on a power network condition message received by the communication interface and according to a first set of rules.

23. The power system controller of claim 22, further comprising the communication interface.

24. The power system controller of claim 22, wherein the controller is configured to:
adjust the power consumption of the useful circuit to a first power consumption level when the power network condition message indicates a normal power condition; and
adjust the power consumption of the useful circuit to a second power consumption level when the power network condition message indicates a low power condition.

25. The power system controller of claim 22, wherein the controller is disposed on an integrated circuit.

26. The power system controller of claim 22, wherein the controller is further configured to transmit a node status message to the other nodes via the communication interface.

27. The power system controller of claim 26, wherein the node status message is configured to notify the other nodes that the node is entering a high power consumption state.

28. The power system controller of claim 26, wherein the controller is configured to:
place the useful circuit in a state in which the useful circuit supplies power to the power network; and
transmit a node status message indicating that the node is providing power to the network.

29. The power system controller of claim 26, wherein the controller is configured to:
place the useful circuit in a high power consumption state; and
transmit a node status message indicating that the node is in a high power consumption state.

30. The power system controller of claim 22, wherein the power system controller is further configured to:
receive a rule override message via the communication interface;
adjust the power consumption of the useful circuit according to a second rule set in response to the rule override message; and
when adjusting the power consumption of the useful circuit according to the second rule set conflicts with the first rule set, transmit an override status message via the communications interface, wherein the override status message is configured to notify the other nodes of an override conflict.

31. A system comprising:
a plurality of nodes, each node comprising:
a power interface configured to be coupled to an AC power line, and
a communication interface, wherein each node is configured to
receive and transmit status messages to and from other ones of the plurality of nodes, and
adjust power consumption or power generation of a useful circuit coupled to the power interface based on the status messages and based on a rule set.

32. The system of claim 31, wherein the plurality of nodes are configured to work in a decentralized manner to reduce power consumed by useful circuits coupled to the plurality of nodes.

33. The system of claim 31, wherein the status messages comprise a status of a node, a load control message or a power generation control message.

34. The system of claim 31, wherein at least one of the plurality of nodes is configured to:
receive a rule override message via the communication interface;
adjust the power consumption of the useful circuit according to a second rule set in response to the rule override message; and
when adjusting the power consumption of the useful circuit according to the second rule set conflicts with the first rule set, transmit an override status message via the communications interface, wherein the override status message is configured to notify other nodes of the plurality of nodes of an override conflict.

* * * * *